United States Patent [19]

Bogart

[11] 3,875,344

[45] Apr. 1, 1975

[54] DIGITAL DATA COMPRESSION METHOD AND SYSTEM

[75] Inventor: Robert W. Bogart, Ellicott City, Md.

[73] Assignee: Westinghouse Electric Corporation, Pittsburgh, Pa.

[22] Filed: Mar. 15, 1973

[21] Appl. No.: 341,644

[52] U.S. Cl. .................... 179/15.55 T, 340/347 DD

[51] Int. Cl. .............................................. H03r 13/24

[58] Field of Search ... 179/15.55 T, 15 BY, 15 BW; 178/DIG. 3; 340/347 DD

[56] References Cited

UNITED STATES PATENTS

| | | | |
|---|---|---|---|
| 2,978,535 | 4/1961 | Brown | 179/15.55 R |
| 3,185,823 | 5/1965 | Ellersick | 179/15.55 R |
| 3,403,226 | 9/1968 | Wintringham | 179/15.55 R |
| 3,564,144 | 2/1971 | Diggelmann | 179/15 BY |
| 3,569,631 | 3/1971 | Johannes | 179/15 BY |
| 3,711,650 | 1/1973 | Kuhn | 179/15 BW |
| 3,789,392 | 1/1974 | Candiani | 340/347 |

*Primary Examiner*—Kathleen H. Claffy
*Assistant Examiner*—E. S. Kemeny
*Attorney, Agent, or Firm*—R. M. Trepp

[57] ABSTRACT

A data compression method and system for logarithmically compressing a digital data signal is disclosed. A digital signal related to the number of successive binary bits of one signal level in the digital data signal is generated by counting the number of successive bits of the one level in the order of decreasing significance of the bits of the digital data signal. The digital signal is then combined with a predetermined number of the uncounted bits of the digital data signal to provide a compressed data signal having fewer bits than the original digital data signal. The digital signal is preferably generated by entering the digital data signal into a serial shift register and monitoring the stage of the shift register initially containing the most significant bit. The digital data signal is then shifted through the shift register in a direction tending to shift each bit into the monitored stage and the number of shifts is counted by a binary counter. The counter is inhibited when a predetermined binary level is detected in the monitored stage of the shift register and the count in the counter is combined with a predetermined number of the bits remaining in the shift register to form the compressed data signal.

10 Claims, 4 Drawing Figures

DIGITAL DATA COMPRESSION METHOD AND SYSTEM

BACKGROUND OF THE INVENTION

1. Field of the Invention

The present invention relates to data compression systems and more particularly to a method and system for logarithmically compressing a digital data signal into a compressed digital signal having fewer bits than the digital data signal.

2. State of the Prior Art

In many digital data transmission systems, more data may be available than can be transmitted within an allotted time span. If only the most significant bits of the digital data signal are transmitted in the allotted time span, the maximum possible error may be rather large. While the maximum possible error is a constant in that the number of bits of the digital data signal lost in transmitting only the most significant bits is known, too great a degree of uncertainty may be introduced in employing this technique.

Logarithmic data compression may be utilized where a greater degree of accuracy of the transmitted digital data signal is required. If logarithmic data compression is employed in the compression of a digital data signal, the maximum possible error is a function of the digital signal being transmitted and thus results in a much smaller average error. However, the control and operational circuitry necessary to perform logarithmic data compression is typically quite complex and expensive.

OBJECTS AND SUMMARY OF THE INVENTION

It is accordingly an object of the present invention to provide a novel method and circuit for compressing a digital data signal.

It is a more specific object of the present invention to provide a novel data compression method and system wherein the compression error is a function of the number of successive bits of one signal level in the most significant bit positions of the digital data signal.

It is yet another object of the present invention to provide a novel logarithmic data compression method and system particularly suited for use in telemetry systems.

These and other objects and advantages are accomplished in accordance with the present invention in which a plural binary bit, digital data signal is compressed by generating a digital signal related to the number of successive binary bits of one signal level in the order of decreasing significance in the digital data signal. The digital data signal is combined with a predetermined number of the most significant of the uncounted binary bits of the digital signal to form a compressed data signal having a number of bits less than that of the original digital data signal.

More specifically, the digital data signal is entered into a serial shift register having a predetermined number of stages and the binary signal level of the stage initially containing the most significant bit of the digital data signal is monitored as the digital data signal is shifted through the shift register. The number of shifts of the shift register is counted until the shifting of the shift register is inhibited in response to the monitoring of a predetermined binary signal level in the monitored shift register stage. The count of the number of shifts and a predetermined number of the binary bits of the digital data signal remaining in the shift register are then provided as the compressed digital output signal.

DETAILED DESCRIPTION

Figure 1:
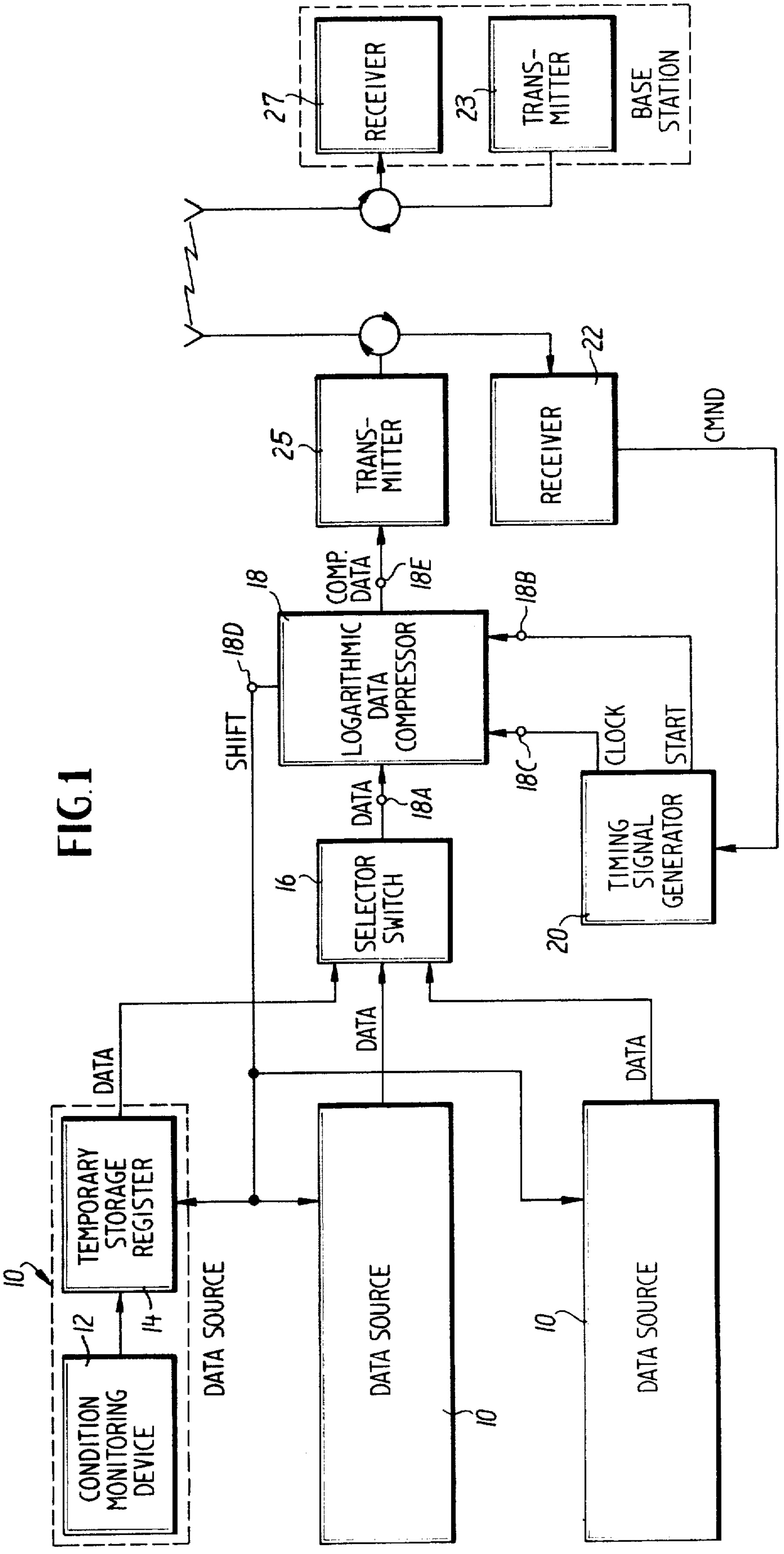
FIG. 1 is a functional block diagram illustrating a telemetry system employing a data compression technique according to the present invention.

The logarithmic data compressor of the present invention is illustrated in the environment of a telemetry system in FIG. 1. However, it should be understood that the data compressor and method according to the present invention may be utilized in any digital data transmission system in which it is desired to transmit more data during an allotted time span than would otherwise be possible.

Referring now to FIG. 1, a plurality of data sources 10 each including, for example, a condition monitoring device 12 and a temporary storage register 14 may each provide a data signal DATA to a selector switch 16. The selector switch 16 may be any suitable conventional mechanical switch or electronic switching arrangement and may selectively apply the DATA signal from each one of the data sources 10 to a logarithmic data compressor 18 via an input terminal 18A.

The initiation and control of the compression of the DATA signal by the logarithmic data compressor 18 may be effected by a suitable timing signal generator 20 under the control of a suitable conventional receiver 22. The receiver 22 may supply command signals CMND to the timing signal generator 20 in response to signals received from a suitable conventional base station transmitter 23. The timing signal generator 20 may generate appropriate timing signals START and CLOCK for application to the logarithmic data compressor 18 via input terminals 18B and 18C respectively.

The logarithmic data compressor 18 may provide a SHIFT signal to shift the data from the data sources 10 through the selector switch 16 to the compressor 18 at the proper time. A compressed data or COMP DATA signal from an output terminal 18E of the logarithmic data compressor 18 may be applied to a suitable conventional transmitter 25 for transmission to a receiver 27 at the base station.

In operation, the condition monitoring device 12 may monitor a variable condition such as temperature, pressure, or the like, or indicate the occurrence of an event. A command from the base station transmitter 23 may initiate a transmission cycle and the output signals from each condition monitoring device 12 may be periodically sampled and stored in the temporary storage register 14 as the DATA signal for compression and transmission to the base station receiver 27 as the COMP DATA signal.

The stored DATA signal may then be shifted out of the temporary storage register 14 in response to the SHIFT signal from the logarithmic data compressor 18 and may be applied through the selector switch 16 to the data compressor 18. The sequencing and timing of the selector switch 16 may be accomplished in any suitable conventional manner in conjunction with timing signals from the data compressor 18 and the timing signal generator 20.

The DATA signal may be, for example, a 16-bit signal and a compression to 9 bits may be desired. The logarithmic data compressor 18 may sequentially compress the 16-bit DATA signal from each of the data sources 10 to a 9-bit COMP DATA signal under the control of the timing signal generator 20. The COMP DATA signal may then be transmitted by the transmitter 25 to the remote base station receiver 27 and there expanded to substantially reproduce the original DATA signal.

As will be appreciated from the subsequent description of the data compressor 18, an accurate representation of the DATA signal may thus be transmitted utilizing fewer binary bits than are present in the original DATA signal. Moreover, a single data compressor may be utilized to compress data from a large number of data sources.

Figure 2:
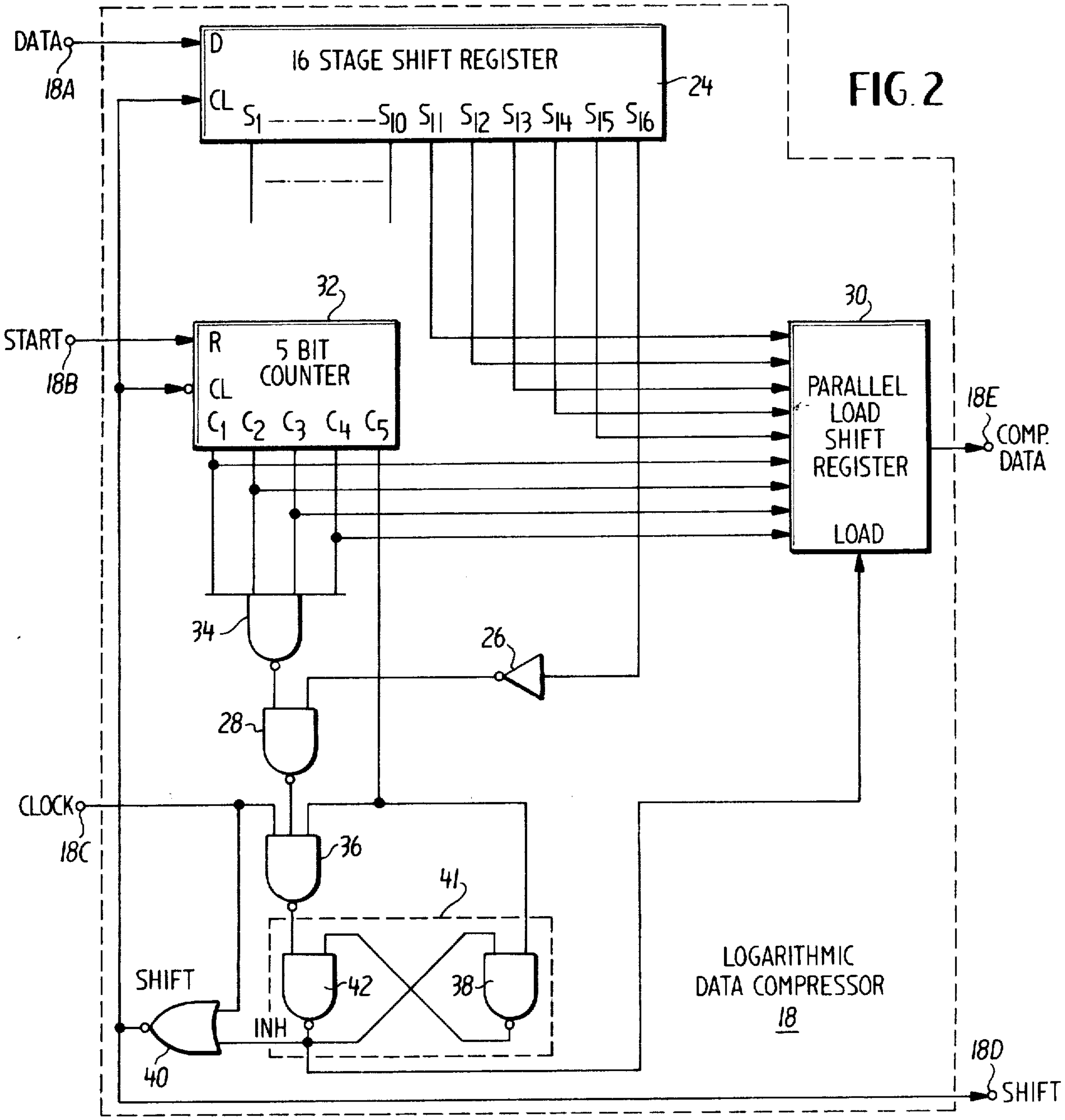
FIG. 2 is a more detailed functional block diagram of the logarithmic data compressor of FIG. 1.

A preferred embodiment of the logarithmic data compressor 18 according to the present invention as applied to a 16-bit to 9-bit compression of data is illustrated in greater detail in FIG. 2. It should be understood that while 16- to 9-bit compression is described in the embodiment illustrated, the present invention may readily be adapted for many different digital data signal lengths and compression ratios.

Referring now to FIG. 2, the DATA signal from the data source 10 selected by the selector switch 16 of FIG. 1 may be applied to the data input terminal D of a conventional 16-stage shift register 24 by way of the input terminal 18A. The output signal from the 16th stage $S_{16}$ of the shift register 24 may be applied through a conventional inverter 26 to one input terminal of a two input terminal NAND gate 28. The output signals from the 11th through the 15th stages $S_{11}$–$S_{15}$ of the register 24 may be applied to five of the data input terminals of a suitable conventional 9-bit parallel load shift register 30 and the output signal from the parallel load shift register 30 may be provided at the output terminal 18E of the data compressor 18 as the COMP DATA signal.

The START signal from the timing signal generator 20 of FIG. 1 may be applied to the reset input terminal R of a suitable conventional 5-bit counter 32 via the input terminal 18B. The output signals from the first four stages $C_1$–$C_4$ of the counter 32 may be separately applied to the input terminals of a four input NAND gate 34 and to the remaining four data input terminals of the parallel load shift register 30. The output signal from the NAND gate 34 may be applied to the other input terminal of the NAND gate 28 and the output signal from the NAND gate 28 may be applied to one input terminal of a three input terminal NAND gate 36.

The output signal from the fifth stage $C_5$ of the counter 32 may be applied to a second input terminal of the NAND gate 36 and to one input terminal of a two input terminal NAND gate 38. The CLOCK signal from the timing signal generator 20 of FIG. 1 may be applied via the input terminal 18C to the third input terminal of the NAND gate 36 and to one input terminal of a two input terminal NOR gate 40. The output signal from the NAND gate 36 may be applied to one input terminal of a two input terminal NAND gate 42 and an inhibit or INH output signal from the NAND gate 42 may be applied to the other input terminal of the NAND gate 38, to the load input terminal LOAD of the parallel load shift register 30, and to the other input terminal of the NOR gate 40. The SHIFT output signal from the NOR gate 40 may be applied to the clock input terminal CL of the shift register 24, to the clock input terminal CL of the counter 32, and at an output terminal 18D of the data compressor 18.

Figure 3:
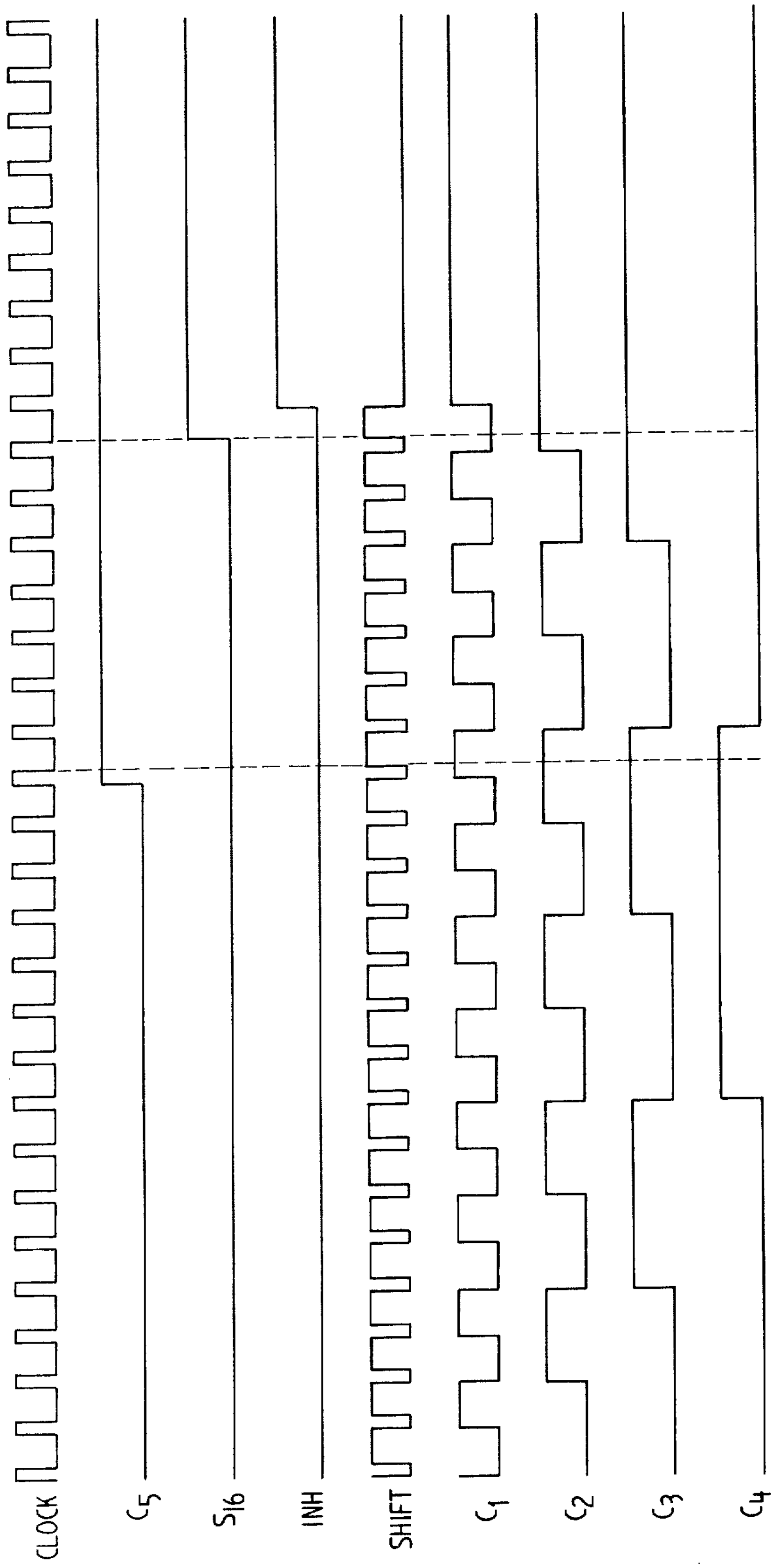
FIG. 3 is a graphical illustration of typical waveforms of the data compressor of FIG. 2 for an examplary digital data signal; and, FIG. 4 is a graph illustrating the maximum possible compression error versus the number represented by the data signal being compressed.

The operation of the logarithmic data compressor of the present invention may be more readily understood with continued reference to FIG. 2 and with further reference to FIG. 3 wherein typical waveforms of the circuit of FIG. 2 are illustrated for an exemplary binary DATA signal having the following form:

$$_{LSB}0010100110000000_{MSB}$$

where: LSB designates the least significant bit of the DATA signal and MSB designates the most significant bit of the DATA signal.

The START signal applied to the counter 32 resets the counter 32 so that the output signals from the counter stages $C_1$–$C_5$ all assume low or binary ZERO signal levels. The low level output signal from the fifth stage $C_5$ of the counter 32 inhibits the NAND gate 36 and insures that the INH output signal from the flip-flop formed by the NAND gates 38 and 42 is at a low signal level.

The low signal level INH signal enables the NOR gate 40 thereby permitting the CLOCK signal to generate the SHIFT signal. The SHIFT signal successively shifts the binary bits of the DATA signal from the selected one of the data sources 10 into the shift register 24 and simultaneously clocks the 5-bit counter 32. When all 16 bits of the DATA signal have been shifted into the shift register 24, the 5-bit counter 32 registers a count of 16 and the fifth stage $C_5$ of the counter 32 assumes a high signal level enabling the NAND gate 35 and the NAND gate 38. Since the signal levels of the five stages of the counter 32 are not all the same until a count of 31 is reached, the output signal from the NAND gate 34 remains at a high or binary ONE signal level. The NAND gate 28 is thus continuously enabled by the binary ONE output signal from the NAND gate 34 and the signal level of the shift register stage $S_{16}$ initially containing the most significant bit of the digital DATA signal is monitored.

With the exemplary data signal given above, the 16th stage $S_{16}$ of the shift register 24 contains a binary ZERO when the shift register is fully loaded, i.e., after 16 SHIFT pulses. The output signal from the NAND gate 28 is thus at a low signal level and inhibits the NAND gate 36 so that the INH signal from the NAND gate 42 remains at a low signal level enabling the NOR gate 40 to pass the CLOCK signal as the SHIFT signal to the shift register 24 and the counter 32.

The DATA signal continues to be shifted through the shift register 24 in a direction tending to shift each bit of the DATA signal into the monitored stage $S_{16}$ of the shift register 24 until the first binary ONE in the DATA signal is shifted into the stage $S_{16}$. The NAND gate 28 thus monitors the binary bits of the DATA signal in the order of decreasing significance of the bits. When a binary ONE is shifted into the stage $S_{16}$, the monitored output signal from the 16th stage $S_{16}$ assumes a high signal level enabling the NAND gate 36 via the NAND gate 28. The immediately subsequent CLOCK signal is passed by the NAND gate 36 to trigger the flip-flop 41 and inhibit the NOR gate 40 by the INH signal which assumes a high signal level.

In the event that no binary ONE has been shifted into the 16th stage $S_{16}$ when the first four stages $C_1$–$c_4$ of the counter 32 assume a high signal level, the output signal from the NAND gate 34 assumes a low signal level and the output signal from the NAND gate 28 assumes a high signal level. As a result of the NAND gate 28 output signal going high, the INH signal assumes a high signal level inhibiting the generation of the SHIFT signal as was previously described.

The inhibiting of the NOR gate 40 prevents the application of the SHIFT signal to the shift register 24 and the counter 32. With the exemplary 16-bit DATA signal previously described, the output signals from the $C_1$–$C_3$ stages of the counter 32 are all at a high signal level as is indicated in FIG. 3 and the output signal from the $C_4$ stage of the counter 32 is at a low signal level. The compressed data signal COMP DATA shifted into the parallel load shift register 30 may thus be expressed in binary form as follows:

| $C_4$ | $C_3$ | $C_2$ | $C_1$ | $S_{15}$ | $S_{14}$ | $S_{13}$ | $S_{12}$ | $S_{11}$ |
|---|---|---|---|---|---|---|---|---|
| 0 | 1 | 1 | 1 | 1 | 0 | 0 | 1 | 0 |

It can be seen from the above that the counter 32 output signal is a binary 7 indicating that the DATA signal contained seven leading binary ZERO's, i.e., the seven most significant bits of the DATA signal were all ZERO's. Since the eighth most significant bit of the DATA signal must have been a binary ONE to result in the above count of seven, the compressed data signal COMP DATA may be utilized to reconstruct a significant portion of the DATA signal. In the present example, the COMP DATA signal may be transformed into the following DATA signal at the remote location:

$$\underbrace{010011}_{S_{11}-S_{16}}\quad\underbrace{0000000}_{\text{seven leading}}\ \text{ZERO'S}$$

As can be seen from the above, the reconstruction data signal provides an accurate indication of the 13 most significant bits of the exemplary DATA signal. Only the three least significant bits of the DATA signal are thus lost.

The loss of data through the logarithmic data compression system of the present invention is a function of the DATA signal being compressed and transmitted. For small binary numbers having at least 10 leading binary ZERO's, i.e., numbers in which the 10 most significant bits are all binary ZERO's, there is no error. With a 16-bit to 9-bit compression, the worst case error is approximately 3.0 percent and this worst case error is halved for each additional bit added to the COMP DATA signal. The average error will, of course, be somewhat less than the worst case error.

Figure 4:
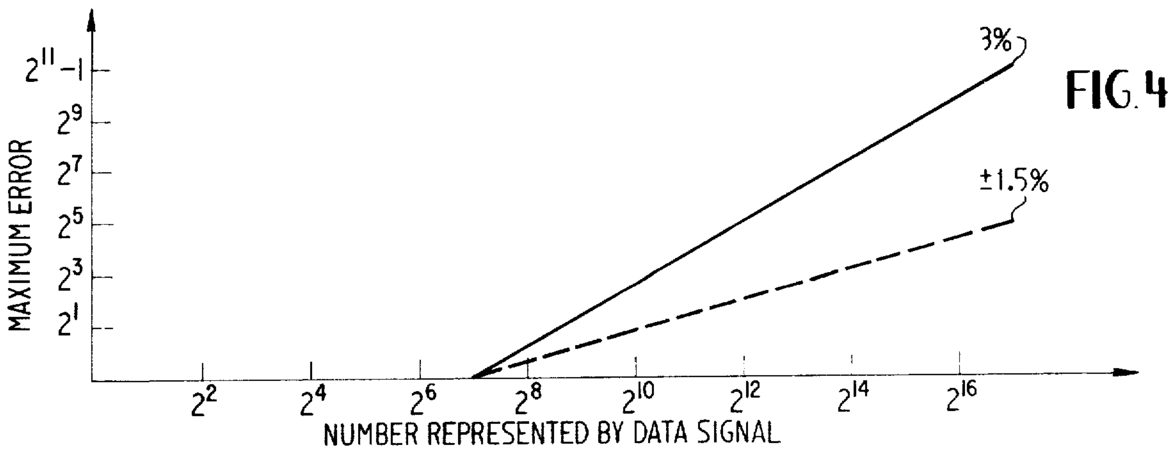

The maximum possible data transmission error versus the size of the number being compressed and transmitted is illustrated graphically in FIG. 4. Referring now to FIG. 4, it can be seen that there is no error for numbers between zero and $2^7$–1, i.e., for numbers up to 127. Beyond this point, the maximum possible error increases directly with the number being compressed and transmitted until, at a maximum of $2^{17}$–1 (the maximum number which can be transmitted with 16 binary bits), the error has a maximum value of $2^{11}$–1.

The error may be minimized in a telemetry system wherein the data is indicative of the occurrence of events by sampling the data at a high rate so that the total count ordinarily does not reach values greatly exceeding $2^7$. Alternatively, since the number of lost bits may be determined from the compressed data or COMP DATA signal, a binary ONE may be arbitrarily added at the half value of the lost portion of the DATA signal. For example, three bits of data are lost with the exemplary DATA signal previously utilized to describe the operation of the DATA compressor. The maximum value of these three bits is a binary 7. A count of three or four may thus be arbitrarily added to the reconstructed data resulting in the graph illustrated in phantom in FIG. 4 wherein the worst case error is ±1.5 percent.

It can be seen from the foregoing description that the data compression system according to the present invention is particularly advantageous in a number of respect. The compression system is relatively simple and may be implemented utilizing currently available integrated circuit (IC) technology either on a single monolithic chip or by combining several standard IC chips.

The system is easily adapted to the compression of data signals of various lengths merely by varying the length of the shift register and the counter control circuitry. Likewise, the compression ratio may be readily adapted to the accuracy requirements of the data transmission system by including the binary bits from additional shift register stages in the compressed output signal.

A maximum of $N$–1 clock times (where $N$ = the number of bits in the DATA signal) is required to compress a data signal and the clock rate is limited only by the speed of the logic circuits utilized to implement the compression system. Thus, the data compression system of the present invention may be operated at an extremely high data transmission rate and may be utilized in conjunction with several data sources as was previously described.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and rage of equivalency of the claims are therefore intended to be embraced therein.

What is claimed is:

1. A circuit for compressing a digital data signal having a predetermined number of binary bits comprising:
   means for generating a digital signal related to the number of successive binary bits of one binary signal level in the digital data signal in the order of decreasing significance of the bits; and,
   means for combining said digital signal with a plurality of the most significant of the uncounted binary bits of the digital data signal to thereby form a compressed data signal having a predetermined lesser number of bits than said digital signal, wherein said generating means comprises:

means for detecting the binary signal level of each successive bit of the digital data signal in the order of decreasing significance of the bits;

means for counting the number of successive detections of the bits of the digital data signal to provide a digital counter output signal; and, means for inhibiting said counting means responsively to the detection of the first bit in said digital data signal having the other of the binary signal levels, wherein said detecting means includes:

a serial shift register having a plurality of stages equal in number to the number of binary bits in the digital data signal;

means for entering the digital data signal into the shift register;

means for monitoring the binary signal level of the stage of the shift register initially containing the most significant bit of the digital data signal; and, means for shifting the digital data signal through the shift register in a direction tending to shift each bit of the digital data signal into the monitored stage of the shift register.

2. The circuit of claim 1 wherein said combining means comprises means responsive to said successive detections counting means and said shift register for providing a digital output signal including the digital counter output signal and a predetermined number of the uncounted bits of the digital data signal in said shift register.

3. The circuit of claim 1 wherein said successive detections counting means comprises:

means for counting the number of shifts of the shift register to provide said digital counter output signal; and, means for inhibiting the shifting of the shift register in response to the monitoring of said other binary signal level by said monitoring means.

4. The circuit of claim 3 wherein said combining means comprises means responsive to said number of shifts counting means and said shift register for providing a digital output signal including the digital counter output signal and a predetermined number of the uncounted bits of the digital data signal in said shift register.

5. A system for compressing a digital data signal having a predetermined number of binary bits comprising:

a serial shift register having a predetermined number of stages;

means for entering the digital data signal into said shift register;

means for monitoring the binary signal level of the stage of the shift register initially containing the most significant bit of the digital data signal;

means for shifting the digital data signal through said shift register in a direction tending to shift each successive bit of the digital data signal into the monitored stage of said shift register;

means for counting the number of shifts of said shift register;

means for inhibiting the shifting of said shift register in response to a change in the signal level of the monitored bits; and, means responsive to said counting means and said shift register for providing a digital output signal having a predetermined number of binary bits less than the number of binary bits of the digital data signal.

6. The system of claim 5 wherein said digital data signal entering means comprises:

means for serially shifting the bits of the digital data signal into said shift register; and, means for counting the number of bits of the digital data signal shifted into said shift register and for indicating the entry of all of the bits of the digital data signal into said shift register.

7. The system of claim 5 wherein said predetermined one of said binary signal levels is a binary ONE signal level and wherein said inhibiting means comprises a bistable device operable to change states and inhibit the shifting of said shift register in response to the monitoring of said binary ONE signal level.

8. A method for compressing a digital data signal having a predetermined number of binary bits comprising the steps of:

generating a digital signal related to the number of successive binary bits of one signal level in the most significant bit positions of the digital data signal; and, forming a compressed data signal having a predetermined lesser number of bits than the digital data signal from the generated digital signal and a plurality of the most significant of the uncounted binary bits of the digital data signal, wherein the digital signal is generated by:

detecting the binary signal level of each successive bit of the digital data signal in the order of decreasing significance of the bits;

generating a binary signal related to the number of detections of binary signal level; and, inhibiting the modification of the generated binary signal responsively to the detection of the first change in the binary signal level of the digital data signal, wherein the binary signal level of each successive bit is detected by:

providing a serial shift register having a plurality of stages equal in number to the number of binary bits in the digital data signal;

entering the digital data signal into the shift register;

monitoring the binary signal level of the stage of the shift register initially containing the most significant bit of the digital data signal; and, shifting the digital data signal through the shift register in a direction tending to shift each bit of the digital data signal into the monitored stage of the shift register.

9. The method of claim 8 wherein the binary signal is generated by counting the number of shifts of the shift register and wherein the modification of the generated binary signal is inhibited by inhibiting the shifting of the shift register in response to the monitoring of said other binary signal level by said monitoring means.

10. A method for compressing a digital data signal having a predetermined number of binary bits comprising the steps of:

entering the entire digital data signal into a shift register having a predetermined number of stages;

monitoring the binary signal level of the stage of the shift register initially containing the most significant bit of the digital data signal;

shifting the digital data signal through said shift register in a direction tending to shift each bit of the digital data signal into the monitored stage of said shift register;

counting the number of shifts of said shift register and providing a digital output signal related to the counted number;

inhibiting the shifting of said shift register in response to the monitoring of a predetermined binary signal level in the monitored stage of the shift register; and, combining the digital output signal with a predetermined number of the bits remaining in the shift register when inhibited to provide a compressed output signal having a predetermined number of binary bits less than the number of binary bits of the digital data signal.

* * * * *